United States Patent
Chandler et al.

(10) Patent No.: US 7,503,362 B2
(45) Date of Patent: Mar. 17, 2009

(54) RUN-FLAT DEVICE

(75) Inventors: Trevor John Chandler, Worcestershire (GB); Bernard John Savage, Brewdley (GB)

(73) Assignee: Runflat International Limited (GB)

( * ) Notice: Subject to any disclaimer, the term of this patent is extended or adjusted under 35 U.S.C. 154(b) by 245 days.

(21) Appl. No.: 10/518,782

(22) PCT Filed: Jun. 16, 2003

(86) PCT No.: PCT/GB03/02580

§ 371 (c)(1),
(2), (4) Date: Jul. 27, 2005

(87) PCT Pub. No.: WO03/106198

PCT Pub. Date: Dec. 24, 2003

(65) Prior Publication Data

US 2005/0263231 A1 Dec. 1, 2005

(30) Foreign Application Priority Data

| Jun. 17, 2002 | (GB) | ............... | 0213810.5 |
| Jun. 17, 2002 | (GB) | ............... | 0213811.3 |
| Jun. 17, 2002 | (GB) | ............... | 0213813.9 |
| Jun. 17, 2002 | (GB) | ............... | 0213814.7 |

(51) Int. Cl.
*B60C 17/00* (2006.01)
*B60C 17/04* (2006.01)
(52) U.S. Cl. .................. 152/516; 152/152; 152/520

(58) Field of Classification Search ............... 152/152, 152/516, 520
See application file for complete search history.

(56) References Cited

U.S. PATENT DOCUMENTS

| 4,393,911 A | 7/1983 | Winfield |
| 5,141,039 A * | 8/1992 | Tansei et al. ............... 152/158 |

FOREIGN PATENT DOCUMENTS

| GB | 849675 A | 9/1960 |
| GB | 1 015 439 A | 9/1979 |
| GB | 2015439 | * 9/1979 |
| WO | WO 99/11476 A | 3/1999 |

OTHER PUBLICATIONS

International Search Report for PCT/GB 03/02580 mailed Oct. 23, 2003.

* cited by examiner

*Primary Examiner*—Justin Fischer
(74) *Attorney, Agent, or Firm*—Caesar, Rivise, Bernstein, Cohen & Pokotilow, Ltd.

(57) ABSTRACT

A run-flat device (13) for fitting on the outer circumference of a wheel (11) inside an inflatable tire (12). The device (13) comprising an annular ring (14) made up of a plurality (preferably three) of arcuate segments (15) interconnected at each end by clamping means (23, 23a, 23b, 28, 29, 35) equally spaced around the ring that imparts to each segment (15) a circumferential clamping force and an axial clamping force to urge the segments circumferentially and axially towards each other.

17 Claims, 4 Drawing Sheets

RUN-FLAT DEVICE

BACKGROUND OF THE INVENTION

This invention relates to vehicle wheels that have inflatable tyres and in particular to devices that are fitted on the rim of a wheel inside the tyre to enable the wheel to run with a deflated tyre. Such devices will hereinafter be called "run-flat devices". The present invention is concerned with clamping devices for clamping together segments of a segmented ring run-flat device.

With conventional wheels that are not fitted with run-flat devices, when the tyre becomes deflated the tyre becomes damaged and can become shredded or thrown off the metal wheel rim. This can cause the vehicle to which the wheel is fitted to loose control, thus endangering other road users. At best, the vehicle can be stopped and the wheel replaced with a spare wheel, or the puncture repaired, or a new tyre fitted to the existing wheel. For commercial vehicles, such as lorries, this is very time consuming and costly because of the need to acquire specialist breakdown or repair services to get the vehicle back on the move again.

With lorries, military vehicles, carriers, such as bullion carriers, security vehicles, or other vehicles where a puncture of a tyre effectively halts the vehicle, and exposes the vehicle to danger from an external threat, there is a need to be able to continue with the vehicle journey irrespective of the deflated tyre.

When a tyre deflates partially or completely, the effective diameter of the wheel with the deflated tyre becomes relatively smaller compared with the wheels with inflated tyres. Therefore, the frictional engagement of the deflated tyre on the road causes the peripheral speed of the deflated tyre to increase to match the peripheral speed of the inflated tyres.

Simultaneously, any differential gearbox in the transmission drive path to a wheel with a deflated tyre will divert torque away from the driven wheels that have inflated tyres to the wheel with the deflated tyre. This in turn causes rotation of the deflated tyre relative to the metal wheel, particularly where the metal wheel is a driven wheel.

SUMMARY OF THE INVENTION

Run-flat devices that fit on the rim of the metal wheel inside the tyre are well known, and usually comprise an annular body on to which that part of the outer circumferential wall of the tyre that is in contact with the ground or road can contact. The annular body is usually made in two parts that are clamped to the outer rim of the metal wheel and the annular body is designed to slip circumferentially on the metal rim when the tyre deflates. This slippage is important because it allows the tyre to slip on the wheel rim whilst ensuring little or no slippage of the tyre relative to the outer circumference of the annular body.

In a prior known device, the annular body comprises two semi-circular segments that are pivotally connected together at each end by a single clamping bolt that clamps the two segments together. Radial clamping of the segments onto the metal wheel is achieved by a cylindrical band extending around the circumference of the segments that can be tightened to pull the segments together prior to tightening the pivot bolts. In this case the pivotal connection at one end of the segments has an elongate slot through which the clamping bolt passes that allows circumferential movement of the segments relative to each other during clamping them on to the rim of the metal wheel. The bolt is accessible for tightening from only one side of the segments.

In a second prior known form of run-flat device having two segments, a single circumferential clamping means is used at one end of the segments. At the other end a simple pivot is provided. The clamping means comprises a slot in one of the segments, and the slot has an inclined surface. A tapered wedge is provided in the slot and engages the inclined surface. A single bolt (accessible from one side) passes through holes in each end of adjoining segments. At least one of the holes is elongated to allow relative circumferential movement of the segments. By tightening the single clamping bolt, the two ends of the segments are pulled together by the wedge to clamp them on to the rim of the metal wheel.

A problem with both of these known types of segmented run-flat devices is that because a single bolt is used at at least one end of the segments, each segment can pivot relative to the other and move out of alignment radially relative to the other segment. This can cause damage to the inside surface of the outer circumferential wall of the tyre when the tyre becomes deflated. This is particularly more of a problem with the prior known run-flat devices that do not use circumferential clamping bands because the two segments tend to open up like jaws under centrifugal and centripetal loads. At worst, even when the tyre is inflated, the leading edge of one segment can protrude beyond the circumference of an adjoining segment of the protruding segment and release the frictional engagement of the annular body on the rim of the metal wheel, allowing relative rotational slippage of the run-flat device on the rim of the metal wheel. Consequently, excessive wear on the run-flat device and the rim of the metal wheel is caused and the wheel becomes unbalanced during normal running. When the tyre deflates, the protruding edges of the displaced segments exacerbate the damage to the inside of the tyre and can cause the annular body to twist out of alignment with the plane of rotation of the wheel. This may lead to the tyre coming off the metal wheel altogether.

A further disadvantage of known segmented run-flat devices is that each segment has a single captive bolt that is only accessible from one side of the segments, and the segments are of an asymmetric shape, with the design of one end of each segment being different from the other end of the same segment. This means that two different sets of segments have to be made depending on whether the segments are to be fitted to the left-hand side or to the right-hand side of the vehicle. This adds to the complexity and cost of manufacture and means that extra spare sets have to be carried by puncture repairers or breakdown personnel.

A further object of the present invention is to provide a run-flat device comprising a plurality of segments that are inter-connected by clamping means that restricts relative pivotal movement between the segments.

A further object of the present invention is to provide clamping means for an annular run-flat device comprising a plurality of arcuate segments in which there is provided circumferentially spaced clamping means around the annular device at each connection between the segments.

A further object of the present invention is to provide a clamping means for segmented run-flat devices that restrict the pivotal movement of the segments relative to each other.

BRIEF DESCRIPTION OF SEVERAL VIEWS OF THE DRAWINGS

The present invention will now be described, by way of an example, with reference to the accompanying drawings in which.

DETAILED DESCRIPTION OF PREFERRED EMBODIMENTS OF THE INVENTION

Figure 1:
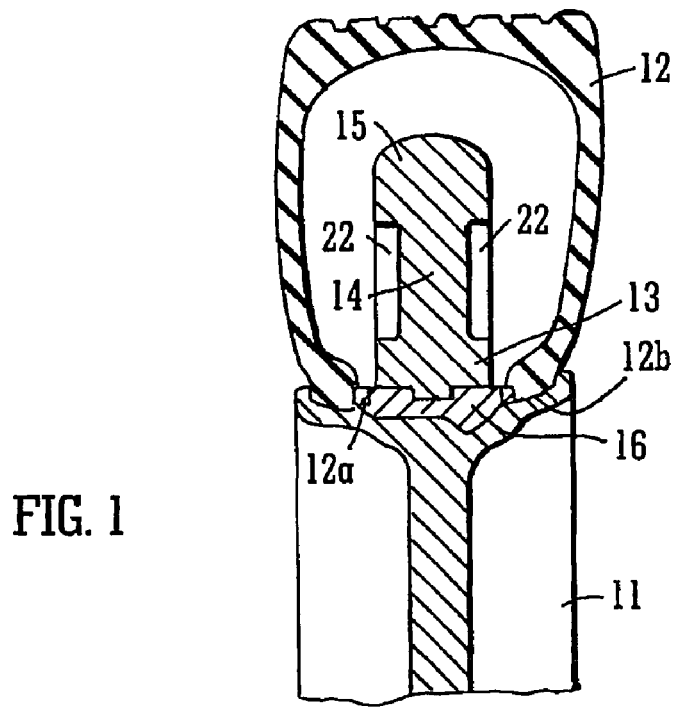
FIG. 1 shows a cross-sectional view through a wheel fitted with a run-flat device incorporating the present invention.
Figure 6:
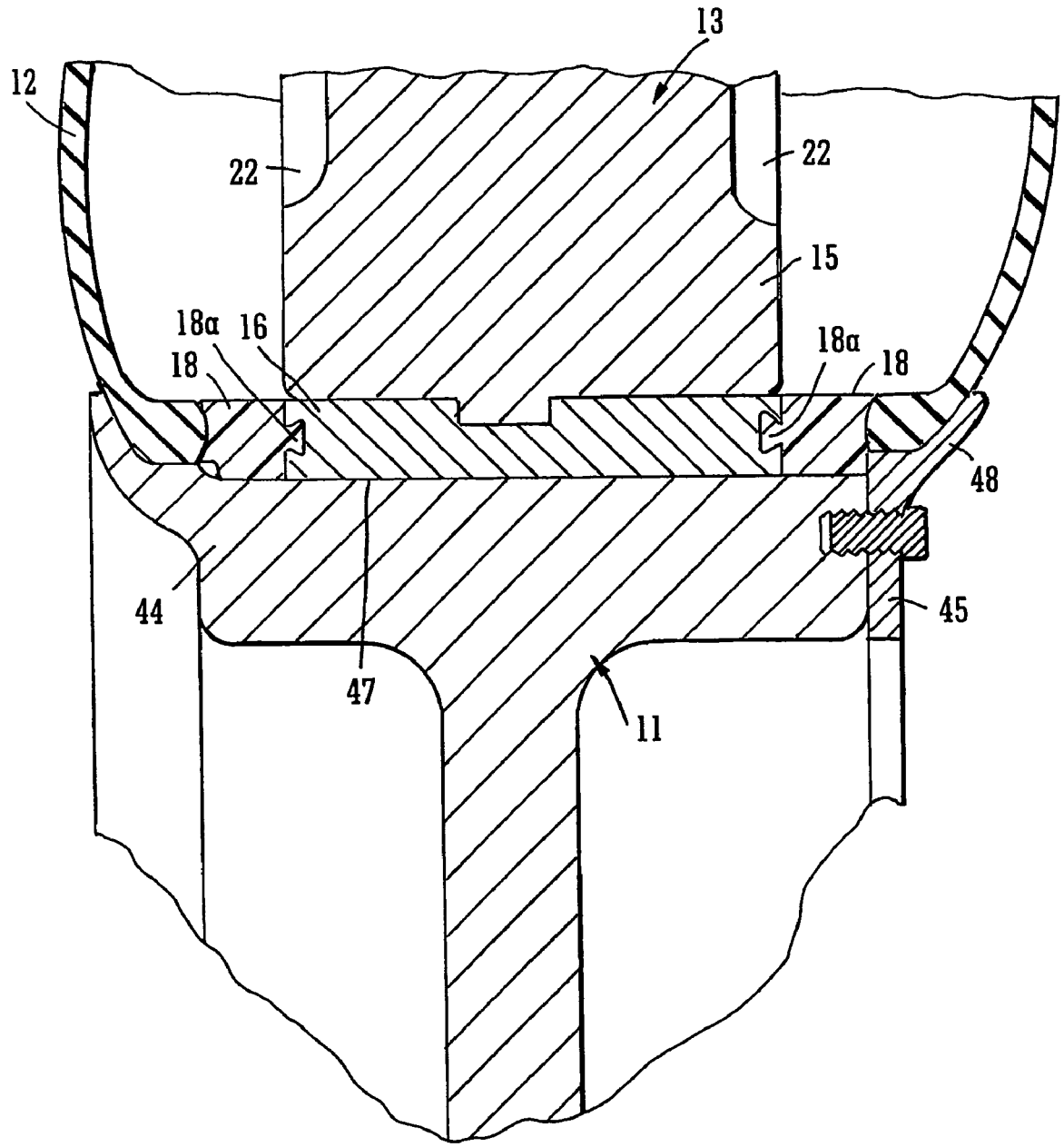
FIG. 6 shows a run flat device of FIGS. 1 to 5 fitted to a two part wheel.

Referring to FIG. 1, there is shown schematically a cross-section through a wheel assembly of a lorry. The wheel assembly 10 comprises a metal wheel 11 that is constructed so as to be capable of being fixed to a wheel hub of a vehicle (not shown) by way of conventional studs and nuts (not shown), or threaded studs (not shown). An inflatable tyre 12 is mounted on the rim of the metal wheel in a conventional manner. The metal wheel is of a single piece construction of the type in widespread use, and is provided with a conventional inflation valve (not shown). The metal wheel could be made of a well-known two-part construction that has a removable rim as shown in FIG. 6.

Figure 5:
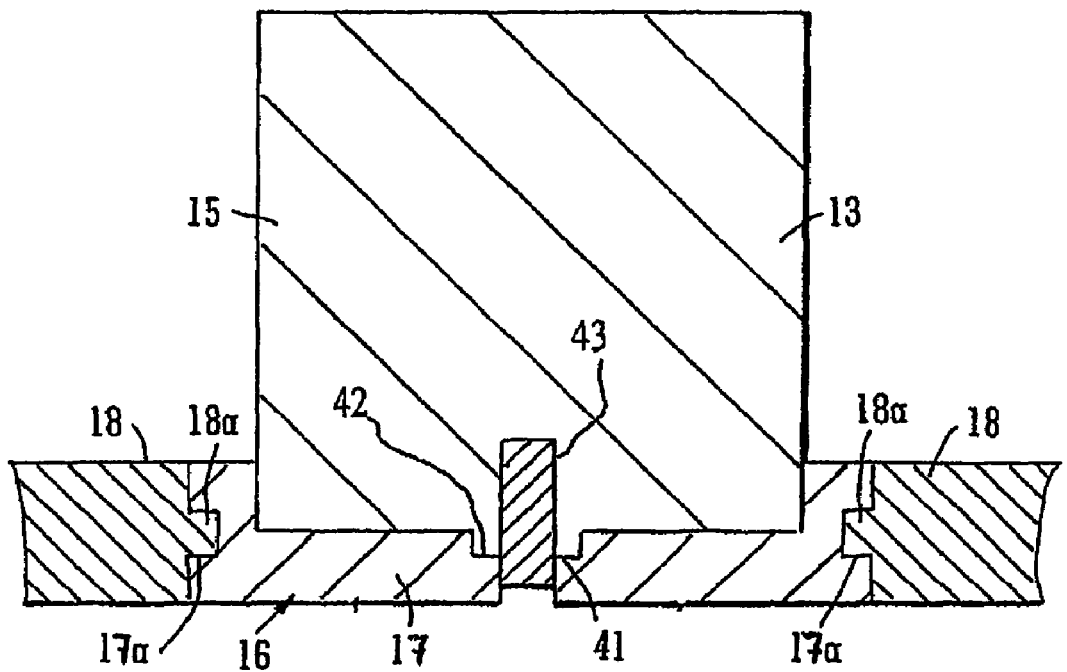
FIG. 5 shows a schematic cross-sectional view of an inner sleeve of the run-flat device of FIG. 2.

Mounted on the rim of the wheel 11 inside the tyre 12 is a run-flat device 13 comprising an annular body 14 made of three nylon segments 15 that are either clamped directly to the outer diameter of the wheel rims, or, as is preferred, is clamped to the outer circumference of an inner sleeve 16 that is split so as to permit the inner sleeve 16 to be opened and snapped in place around the outer diameter of the wheel 11. The inner sleeve 16 is made of nylon, but it could be constructed with a nylon central band 17 and polyurethane edge bands 18 as shown in FIG. 5. The central band has a dove-tail shaped recess 17(a) on each side face and the polyurethane side bands 18 each have a dove-tail shaped side member 18(a) that fits into one of the recesses 17(a). The central band 17 provides rigidity to resist side-loads of the side walls as they collapse inwards whilst the polyurethane side bands 18 provide rigidity with slightly more flexibility or resilience than the nylon central band 17 to cushion the contact between the beads of the side-walls of the tyre 12 to avoid damage to the tyre 12 when the tyre deflates.

The outer circumference of the central band 17 has a recess 41 and the inner circumference of the segments 15 have a flange 42 that locates in the recess 41. A lubricant may be provided between the outer circumference of the inner sleeve 16 and the inner circumference of the segments 15.

It will be appreciated that at high rim speeds, the run-flat device 13 is subject to centripetal and centrifugal forces which tend to loosen the circumferential grip of the run-flat device 13 on the metal wheel 11. A shear pin 43 may be provided (as shown in FIG. 5) for each segment 15 to accommodate this radial movement whilst restraining the segments 15 circumferentially until the pins 43 are sheared by the deflated tyre contacting the segments 15 and causing the segments 15 as a complete ring to rotate. The shear pin 43 is inserted through a hole in the central part of the rim of the wheel and through the inner sleeve 16.

The inner circumference of the inner sleeve 16 may be profiled to match the profile of a specific metal wheel, or could simply bridge across the recesses or wells of the metal wheel 11 between the surfaces 12(a), 12(b) on which the beads of the side walls of the tyre 12 sit. The inner sleeve 16 must be shaped so as not to impede the fitting of the tyre because it is necessary to provide gaps or circumferential recesses that allow each side wall of the tyre 12 to fit as the tyre is slipped over the front rim of the metal wheel 11 prior to inflation. The inner sleeve 16 functions as a tyre bead retainer that stops the sidewalls of the tyre 12 collapsing inwards when the tyre is deflated.

Referring now to FIG. 6 there is shown a second type of metal wheel 11 fitted with a run-flat device 13 of the present invention. In this design of wheel, the metal wheel 11 is in two parts 44 and 45. The main part 44 of the wheel constitutes the rear rim 46 and central rim 47 of the wheel 11 on to which the rear wall of the tyre 12 is fitted and the second part 45 constitutes the front rim 48 that retains the front side wall of the tyre 12. The second part 45 is bolted to the main part 44 of the wheel prior to inflation of the tyre 12. The run-flat device 13 is of a similar construction to that described and shown in FIGS. 2 to 5.

It will be appreciated that the inner sleeve 16 shown in FIG. 1 effectively blocks off the deep wells formed in the rim of the metal wheel and serves to stop the side walls of the tyre falling into the deep wells when the tyre deflates. Clearly in those designs of metal wheel that do not have deep wells and those that have cylindrical or slightly conical central rims with in-built bead retaining features (such as for example similar to that shown in FIG. 6) the inner sleeve 16 may be dispensed with but in this case a bead retaining device may be needed or the inner periphery of the segments modified to form a bead retaining device. We prefer to keep the inner sleeve 16 as the bead retainer.

Figure 3:
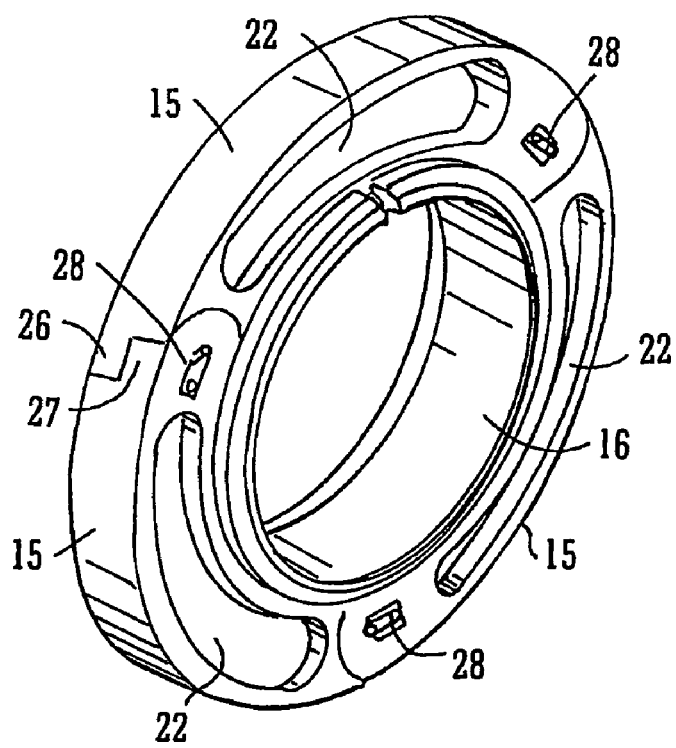
FIG. 3 is a schematic perspective view of the run-flat device of FIG. 1.
Figure 2:
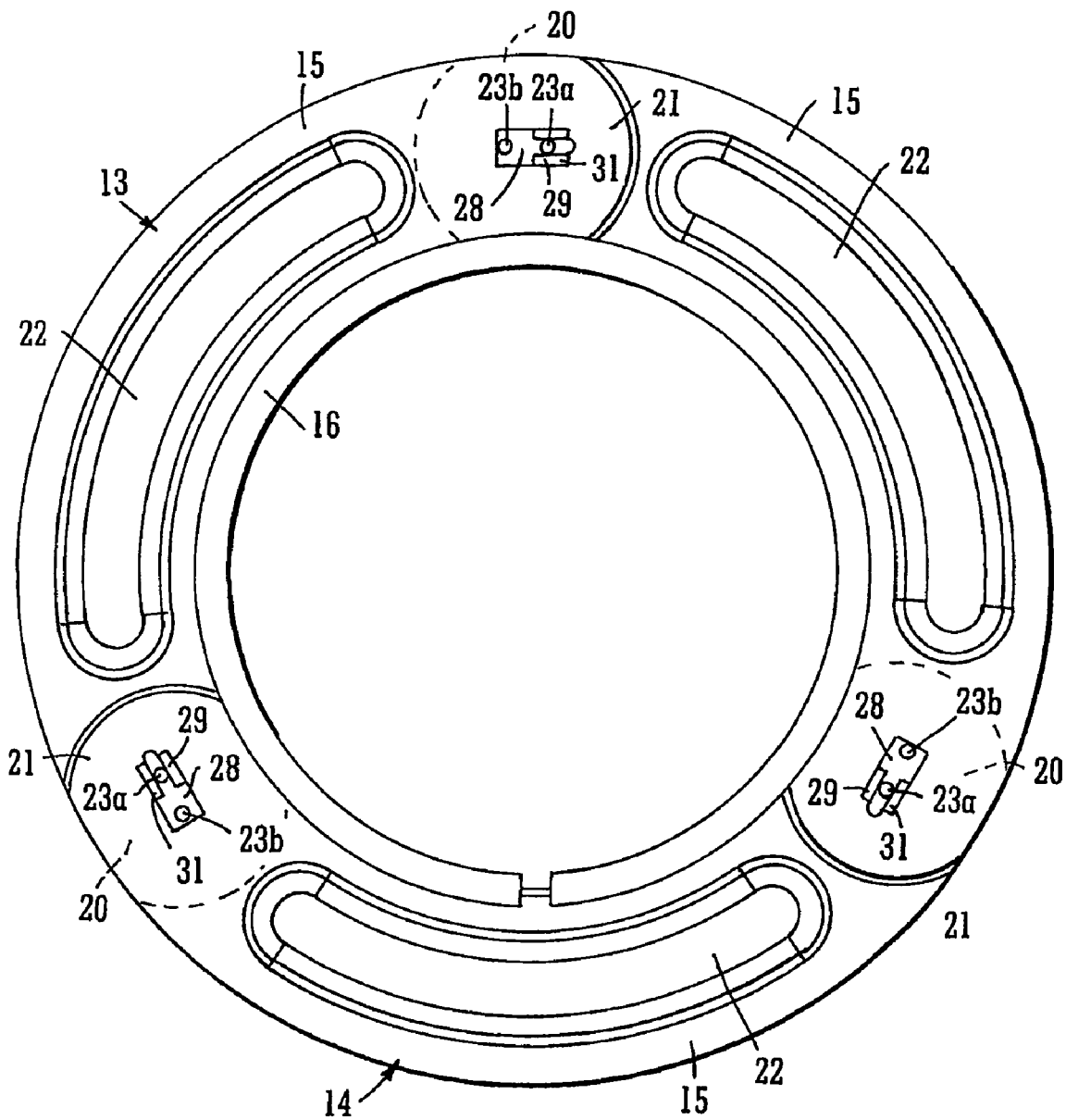
FIG. 2 is a side elevation showing a segmented ring and inner sleeve of the run-flat device of FIG. 1.

Referring in greater detail to FIGS. 2 and 3, the three segments 15 are symmetrical about a radial plane orthogonal to the axis of rotation of the wheel and are of identical shape whether for a left-hand wheel or a right-hand wheel. Each segment is a segment of a hollow cylinder with a concave end 20 and a convex end 21. The convex ends 21 are of a complementary shape to the concave ends 20 so that the convex end 20 of each segment 15 nestles into the concave end 21 of an adjacent segment 15. The segments 15 are assembled inside the tyre 12 with the convex ends 21 constituting the leading edge relative to the direction of rotation of the tyre 12 when it is running wholly deflated. Each segment 15 has an arcuate recess 22 on each side to lighten the segments.

At each end of the segments 51 there is provided a clamping means 23 constructed in accordance with the present invention in the form of two parallel bolts 23(a), 23(b). The shape of the ends of adjacent segments 15 and details of the clamping means is best seen in FIG. 3.

Figure 4:
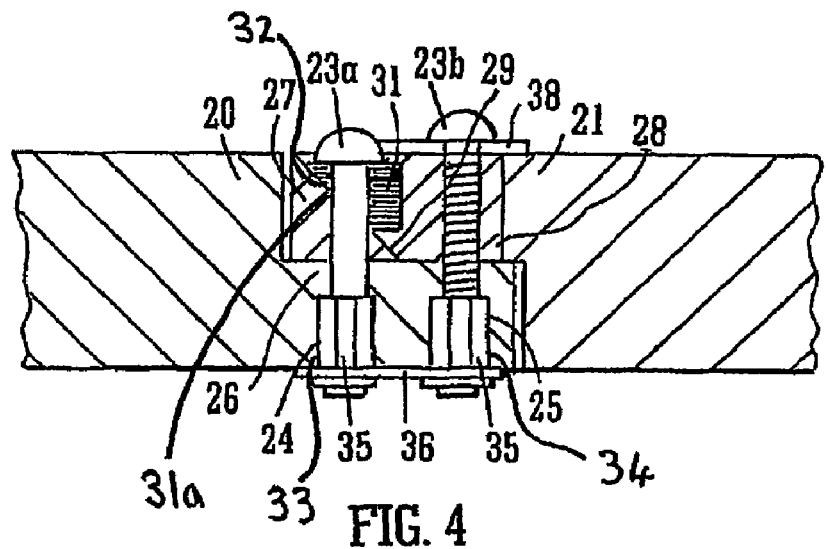
FIG. 4 shows a cross sectional view through the ends of two adjacent segments of the run flat device of FIG. 2 and shows in greater detail the clamping means of the present invention.

Referring to FIGS. 2, 3 and 4, the concave end 20 of each segment has a flange 26 of half the thickness of each segment and two circumferentially spaced holes 24, 25 are drilled through the flange 26. The holes 24 are of a slightly larger diameter than that of the bolts 23(a) and 23(b) to allow relative movement of the end 20 relative to end 21. The convex end 21 of each segment has a flange 27 that overlaps the flange 26 in a circumferential direction. The flange 27 is provided with an elongate slot 28 that has inclined surfaces 29 that face away from the concave end 20 of the adjacent segment 15.

A wedge 31 having an inclined face 32 that abuts the inclined face 29 of the slot 28 in the convex end 21 of the segment 15 is placed in the slot 28 with the inclined face of the wedge 31 in contact with the inclined faces 29. The wedge 31 has a hole 31(a) through which one of the dome-headed clamping bolts 23(a) is passed. The ends 21 of the segments have two spaced holes 33, 34 that align with the holes 24, 25 in ends 20. Two captive nuts 35 are mounted on a retaining plate 36 and the nuts 35 are inserted into the holes 33, 34 in the flanges 27. By tightening the first bolt 23(a) the wedge 31 urges the ends of the segments together in a circumferential direction. A second dome headed clamping bolt 23(b) is passed through a hole 37 in a clamping plate 38, through the slot 28 and holes 34 and screwed into the second captive nut 35.

The clamping plate 38 bridges the slot 28 and is shaped so as not to interfere with bolt 23(a). When bolt 23(b) is tightened the clamping plate 38 engages a sidewall of the segment

(15) and pulls the two flanges 26, 27 axially together in a direction parallel to the axis of rotation of the wheel 11.

To fit the run-flat device 13, the rear side wall of the tyre 12 is levered on to the front rim of the metal wheel 11 and then the inner sleeve 16 is prised open and fitted over the rim of the metal wheel inside the deflated tyre 12. The slit 39 in the inner sleeve 16 is positioned to align with the inflation valve of the wheel (not shown). The rear wall of the tyre is then pushed over the sleeve 16 on to the rear rim. The segments 15 are inserted into the cavity of the deflated tyre from the front and are loosely assembled around the inner sleeve 16 with the heads of the bolts 23(a), 23(b) facing outwards. The wedges 31 are then tightened down by tightening the bolts 23(a) evenly, and this causes the wedges 31 to pull the segments 15 together and thereby clamp the segments 15 firmly to the inner sleeve 16 and clamp the inner sleeve 16 to the rim of the metal wheel 11. With the run-flat device 13 clamped on to the rim of the metal wheel 11 the bolts 23(b) are fully tightened to clamp the flanges 26 and 27 together axially. The outer sidewall of the tyre 12 is then levered over the front rim of the metal wheel 11 and the tyre 12 inflated.

In use, when the tyre 12 deflates, the tyre 12 collapses onto the outer circumferential surface of the run-flat device 13 in the region where the tyre 12 contacts the ground or road. This causes the run-flat device 13 to slip circumferentially on the rim of the metal wheel 11. This slippage between either the segments 15 and the rim of metal wheel (where no inner sleeve 16 is fitted) or between the segments 15 and the inner-sleeve 16 (where a sleeve 16 is fitted), ensures that there is little or no relative rotation between the tyre 12 and the run-flat device 13 and consequently little or no damage to the tyre 12. The beads of the sidewalls of the tyre 12 are prevented from collapsing inwards by the inner sleeve 16 that acts as a bead retainer when the tyre deflates.

It will be appreciated that at high rim speeds, the run-flat device 13 is subject to centripetal and centrifugal forces, which, in the absence of the second bolt 23(b) would loosen the circumferential grip of the run-flat device 13 on the metal wheel 11 by allowing the segments 15 to pivot relative to each other. By using two parallel bolts 23(a), 23(b) pivotal movement of the segments relative to each other is restricted or prevented. The bolts 23(a), 23(b) also provide both clamping in the circumferential direction and clamping in the axial direction (in a direction along the axis of rotation of the wheel) and prevent the segments twisting out of alignment with the wheel 11 when the deflated tyre contacts the outer circumference of the run-flat device 13.

What is claimed is:

1. A run-flat device for fitting on the outer circumferences of a wheel inside an inflatable tyre, said device comprising an annular ring made up of a plurality of arcuate segments having a flange at each end that overlaps circumferentially the corresponding flanges of adjacent segments, which flanges are interconnected by clamping means equally spaced around the ring that imparts to each segment a circumferential clamping force and an axial clamping force to urge the segments circumferentially and axially towards each other wherein the clamping means comprises a first and second clamping bolts which pass through a pair of spaced holes formed in the adjacent flanges, said device additionally comprising a retaining plate having two captive nuts mounted thereon, for securing the first and second clamping bolts and to prevent lateral twisting of the flanges, and a clamping plate spaced remotely from said retaining plate and shaped so as not to interfere with one of said clamping bolts, wherein the clamping means further comprises a slot provided in one of the flanges at one end of each segment that includes an inclined surface that faces away from the immediately adjacent segment, a wedge provided in the slot, said wedge having an inclined surface that contacts the inclined surface of the slot, and having a hole that aligns with a first hole of the pair of spaced holes in the flanges, and a first such clamping bolt that passes through the first hole of the pairs of holes and the hole in the wedge whereby tightening of the said first bolt causes the wedge to urge the segments towards each other circumferentially, and the clamping means further includes the second such clamping bolt substantially parallel to the first bolt, said second bolt passing through the second hole of the pair of holes in the flanges and through said clamping plate in contact with a side face of the segment whereby tightening of the second bolt clamps the flanges of the segments together axially, and the combined clamping effect of the two bolts restricts pivotal movement of the segments relative to each other, and wherein the captive nuts are located within the first and second holes.

2. A run-flat device according to claim 1 wherein there is provided a split inner sleeve for fitment to the rim of the wheel and onto the outer circumference of which the segments sit.

3. A run-flat device according to claim 1 wherein there is provided a split inner sleeve for fitment to the rim of the wheel and onto the outer circumference of which the segments sit.

4. A run-flat device according to claim 1 wherein there is provided a split inner sleeve for fitment to the rim of the wheel and onto the outer circumference of which the segments sit.

5. A run-flat device according to claim 2 wherein the inner circumference of the inner sleeve is profiled to match the profile of the outer circumference of the wheel.

6. A run-flat device according to claim 3 wherein the inner circumference of the inner sleeve is profiled to match the profile of the outer circumference of the wheel.

7. A run-flat device according to claim 4 wherein the inner circumference of the inner sleeve is profiled to match the profile of the outer circumference of the wheel.

8. A run-flat device according to claim 2 wherein the outer circumference of the inner sleeve has a recess, and each segment has a flange on its inner circumferential surface that engages in the recess on the inner sleeve.

9. A run-flat device according to claim 3 wherein the outer circumference of the inner sleeve has a recess, and each segment has a flange on its inner circumferential surface that engages in the recess on the inner sleeve.

10. A run-flat device according to claim 4 wherein the outer circumference of the inner sleeve has a recess, and each segment has a flange on its inner circumferential surface that engages in the recess on the inner sleeve.

11. A run-flat device according to claim 2 wherein the inner sleeve comprises a central band and two side bands made of a material that is more resilient than the material of the central band.

12. A run-flat device according to claims 11 wherein the central band is made of nylon.

13. A run-flat device according to claim 11 wherein the side bands are made of polyurethane.

14. A run-flat device according to claim 1 wherein the segments are identical in shape.

15. A run-flat device according to claim 1 wherein the segments are identical in shape.

16. A run-flat device according to claim 1 wherein the segments are identical in shape.

17. A run-flat device according to claim 2 wherein a shear pin is provided between the inner sleeve and each of the segments to resist circumferential movement of the sleeves relative to the inner sleeve during normal running of the wheel.

* * * * *